(No Model.)

J. HOLLY.
SPIRIT LEVEL.

No. 363,140. Patented May 17, 1887.

WITNESSES
F. L. Ourand
E. F. Murdock

INVENTOR
John Holly
per J. Tarbell
Attorney

UNITED STATES PATENT OFFICE.

JOHN HOLLY, OF ROUSEVILLE, PENNSYLVANIA.

SPIRIT-LEVEL.

SPECIFICATION forming part of Letters Patent No. 363,140, dated May 17, 1887.

Application filed January 26, 1887. Serial No. 225,522. (No model.)

*To all whom it may concern:*

Be it known that I, JOHN HOLLY, a citizen of the United States, residing at Rouseville, in the county of Venango and State of Pennsylvania, have invented certain new and useful Improvements in Spirit-Levels; and I do hereby declare the following to be a full, clear, and exact description of the invention, such as will enable others skilled in the art to which it appertains to make and use the same.

This invention relates to improvements in spirit-levels; and it consists in the arrangement and construction of the parts, whereby the angle of inclination is marked upon a graduated scale, greater accuracy is attained, and the parts can be adjusted and taken apart.

Figure 1:
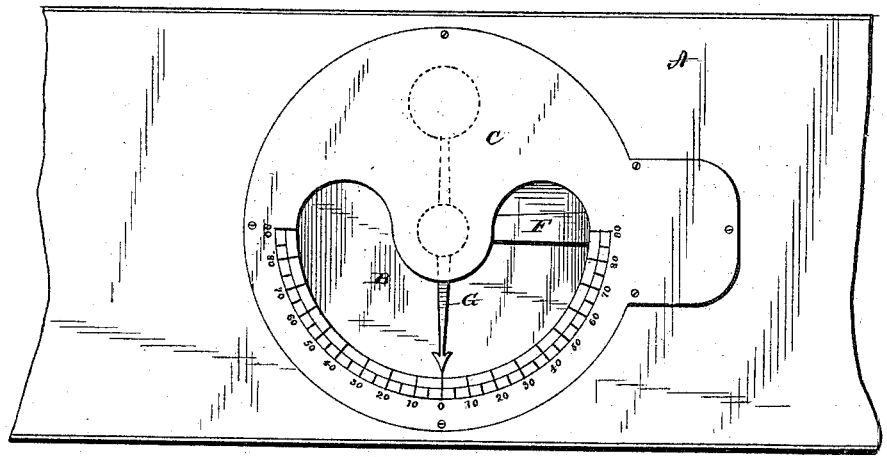
Figure 2:
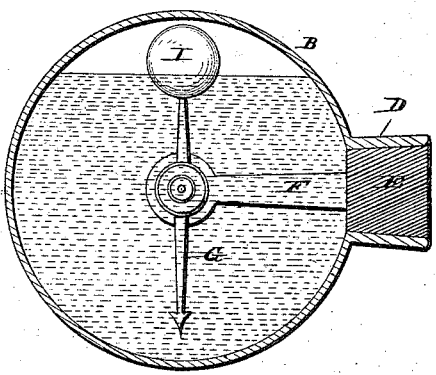
Figure 3:
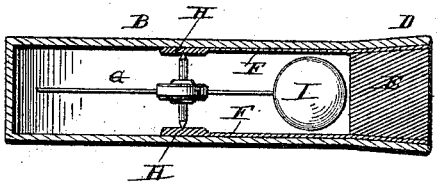

In the drawings, Figure 1 is a view of a straight-edge provided with my level. Fig. 2 is a longitudinal section of the level detached. Fig. 3 is a cross-section of the same.

The letter A designates a straight-edge provided about the middle with a perforation large enough to receive the glass vial B. The perforation is rabbeted slightly around the edge to receive the brass guards C. The said guards are cut, substantially as shown, leaving an open space through which the pointer in the vial B can be seen. Upon the edge of this opening is marked a scale, substantially as shown. The said guards are secured to the straight-edge by small screws. Between the said guards is placed the flat vial B. The said vial is adapted to fit the perforation in the said straight-edge, and is provided with a neck, D. Fitting the said neck is a cork, E, which is provided with two parallel spring-arms, F, extending from the said cork to the center of the vial. The said arms are provided at the end with sockets to receive the pivot-bearings of the pointer G. The said pointer is balanced nicely within said sockets upon the pivot-bearings H, and is provided at the one extremity with an arrow-head and at the other with an air-globe, I. The said pointer, including air-globe, is of less length than the diameter of the vial B.

In preparing this invention for operation the vial B is filled with any suitable spirits. The pointer G is nicely balanced in the arms F. The air-globe I is raised between the arms F, and the whole inserted in the vial B, and the cork E placed within the neck D, and then hermetically sealed. The vial is then put into the perforation in the straight-edge and the guards C placed upon either side, so that a line drawn through the center of the vial and the zero-index is at right angles to the straight-edge.

Having thus arranged the parts, the operation of the index is controlled by the air-globe I, which seeks the point farthest removed from the center of gravity. If the straight-edge is raised at one end, the inclination will be shown by the deviation of the pointer from the zero-point upon the guard.

The construction may be varied by cutting a scale upon the vial B, if so desired.

What I claim is—

In a level such as described, the combination of a stationary scale, a pointer consisting of a balanced arm, the one extremity of which is provided with a float, bearings for the said arm, consisting of two arms depending from the stopper of the vessel inclosing said pointer and extending to the center of said vessel, where sockets are formed, and said vessel provided with an opening, substantially as described, and adapted to fit a perforation formed for that purpose in the level-stock, substantially as set forth.

In testimony whereof I affix my signature in presence of two witnesses.

JOHN HOLLY.

Witnesses:
F. W. HAYS,
ARTHUR ROSE.